US012085342B2

(12) United States Patent
Takahashi

(10) Patent No.: US 12,085,342 B2
(45) Date of Patent: Sep. 10, 2024

(54) MOLTEN METAL DRIVING DEVICE, MOLTEN METAL STIRRING SYSTEM, MOLTEN METAL CONVEYING SYSTEM, CONTINUOUS CASTING SYSTEM, AND MOLTEN METAL DRIVING METHOD

(71) Applicant: ZMAG, LTD., Shiroi (JP)

(72) Inventor: Kenzo Takahashi, Shiroi (JP)

(73) Assignee: ZMAG, LTD., Shiroi (JP)

( * ) Notice: Subject to any disclaimer, the term of this patent is extended or adjusted under 35 U.S.C. 154(b) by 0 days.

(21) Appl. No.: 18/431,876

(22) Filed: Feb. 2, 2024

(65) Prior Publication Data

US 2024/0175634 A1 May 30, 2024

Related U.S. Application Data

(63) Continuation of application No. PCT/JP2022/028613, filed on Jul. 25, 2022.

(30) Foreign Application Priority Data

Aug. 16, 2021 (JP) ................................ 2021-132454

(51) Int. Cl.
*B22D 11/115* (2006.01)
*B22D 35/00* (2006.01)
*F27D 27/00* (2010.01)

(52) U.S. Cl.
CPC ............ *F27D 27/00* (2013.01); *B22D 11/115* (2013.01); *B22D 35/00* (2013.01)

(58) Field of Classification Search
CPC ...... B22D 11/115; B22D 11/122; B22D 35/00
See application file for complete search history.

(56) References Cited

U.S. PATENT DOCUMENTS 4,281,263 A 7/1981 Virolleau et al.

FOREIGN PATENT DOCUMENTS

| | | |
|---|---|---|
| EP | 0 374 563 A1 | 6/1990 |
| JP | 50-22716 A | 3/1975 |
| JP | S 50-022716 | 3/1975 |
| JP | 54-163729 A | 12/1979 |
| JP | S 54-163729 | 12/1979 |
| JP | 2-182358 A | 7/1990 |
| JP | H 02182358 A | 7/1990 |
| JP | 9-136147 A | 5/1997 |
| JP | H 9-136147 | 5/1997 |

OTHER PUBLICATIONS

International Search Report of PCT/JP2022/028613 Mailed on Oct. 4, 2022.
Written Opinion of International Searching Authority of PCT/JP2022/028613 mailed on Feb. 29, 2024.

*Primary Examiner* — Kevin P Kerns
*Assistant Examiner* — Steven S Ha
(74) *Attorney, Agent, or Firm* — WTA Patents

(57) ABSTRACT

A magnetic field device of a molten metal driving device includes iron cores, yokes coupling the iron cores, coils wound around the iron cores so as to sandwich the yoke, coils wound around the iron cores so as to sandwich the yoke, and coils wound around the iron cores so as to sandwich the yoke, the coils being wound so as to generate a magnetic field toward the yoke when a first-phase current flows, the coils being wound so as to generate a magnetic field toward the yoke when a second-phase current flows, the coils being wound so as to generate a magnetic field toward the yoke when a third-phase current flows.

15 Claims, 15 Drawing Sheets

MOLTEN METAL DRIVING DEVICE, MOLTEN METAL STIRRING SYSTEM, MOLTEN METAL CONVEYING SYSTEM, CONTINUOUS CASTING SYSTEM, AND MOLTEN METAL DRIVING METHOD

CROSS-REFERENCE TO RELATED APPLICATIONS

This application is a bypass continuation of International PCT Application No. PCT/JP2022/028613, filed on Jul. 25, 2022, which claims priority to Japanese Patent Application No. 2021-132454, filed on Aug. 16, 2021, which are incorporated by reference herein in their entirety.

TECHNICAL FIELD

The present invention relates to a molten metal driving device, a molten metal stirring system, a molten metal conveying system, a continuous casting system, and a molten metal driving method.

BACKGROUND ART

Conventionally, a molten metal driving device that drives molten metal of a non-ferrous metal such as aluminum or copper (hereinafter, simply referred to as "molten metal") by electromagnetic force is known. The molten metal driving device includes a magnetic field device that generates a moving magnetic field. When the moving magnetic field runs in the molten metal, an eddy current is generated in the molten metal. The electromagnetic force acts on the molten metal by the eddy current, and the molten metal is driven.

As a molten metal driving device using electromagnetic force, for example, Patent Literature 1 describes a molten metal stirring device that causes a three-phase AC current to flow through a plurality of coils wound around an annular iron core to generate a moving magnetic field, and stirs molten metal present inside the annular iron core.

In addition, a linear motor type molten metal driving device is also widely used. In such system, a plurality of yokes (magnetic poles) are provided in parallel to each other on one plate-shaped iron core, and a coil is wound around a side surface of each yoke. When the coil wound around the yoke is energized, a magnetic field is emitted from the yoke.

SUMMARY

Meanwhile, in order to secure sufficient driving force to the molten metal, it is required to generate a magnetic field having sufficient strength in a space where the molten metal to be driven exists.

As a method for generating a strong magnetic field, it is conceivable to apply a large current to the coil. However, as the current flowing through the coil increases, the power consumption increases, and there is a problem that the running cost of the molten metal driving device increases. Furthermore, since the amount of heat generated by the molten metal driving device increases and a powerful cooling facility of, for example, a water-cooling type is required, not only the manufacturing cost but also the maintenance cost increases.

As another method for generating a strong magnetic field, it is conceivable to increase the number of turns of the coil. However, the inductance of the coil increases in proportion to the square of the number of turns of the coil. For this reason, there is a problem that the flow of the AC current is hindered and a strong magnetic field cannot be obtained. Furthermore, it is known that the driving force is proportional to the frequency of the AC current, but when the number of turns of the coil is increased and the inductance is increased, it becomes difficult to increase the frequency of the AC current.

The present invention has been made based on the above technical recognition, and an object of the present invention is to provide a molten metal driving device, a molten metal stirring system, a molten metal conveying system, a continuous casting system, and a molten metal driving method capable of obtaining a large driving force with low power consumption. A molten metal driving device according to an embodiment of the present invention is a molten metal driving device for driving molten metal, the molten metal driving device including: a plurality of iron cores; a first yoke that couples the plurality of iron cores; a second yoke that is adjacent to the first yoke and couples the plurality of iron cores; a third yoke that is adjacent to the second yoke and couples the plurality of iron cores; a first coil and a second coil wound around at least one of the plurality of iron cores so as to sandwich the first yoke; a third coil and a fourth coil wound around at least one of the plurality of iron cores so as to sandwich the second yoke; and a fifth coil and a sixth coil wound around at least one of the plurality of iron cores so as to sandwich the third yoke, in which both the first coil and the second coil are wound so as to generate a magnetic field toward the first yoke when a first-phase current flows, both the third coil and the fourth coil are wound so as to generate a magnetic field toward the second yoke when a second-phase current flows, and both the fifth coil and the sixth coil are wound so as to generate a magnetic field toward the third yoke when a third-phase current flows.

Furthermore, in the above molten metal driving device, a plurality of sets of a set of the first yoke, the second yoke, and the third yoke may be provided for the plurality of iron cores.

Furthermore, in the above molten metal driving device, the plurality of iron cores may have a thickness in a direction in which the first yoke, the second yoke, and the third yoke extend, the thickness being smaller than an interval between the plurality of iron cores.

Furthermore, in the above molten metal driving device, the plurality of iron cores may have a thickness in the direction in which the first yoke, the second yoke, and the third yoke extend, the thickness being smaller than a thickness in a direction orthogonal to the direction in which the first yoke, the second yoke, and the third yoke extend.

Furthermore, in the above molten metal driving device, the first coil and the second coil may be connected in series to constitute a first series coil, the third coil and the fourth coil may be connected in series to constitute a second series coil, the fifth coil and the sixth coil may be connected in series to constitute a third series coil, and the first series coil, the second series coil, and the third series coil may be star-connected.

Furthermore, the above molten metal driving device may further include an AC power supply that causes an R-phase current to flow through the first series coil, causes an S-phase current to flow through the second series coil, and causes a T-phase current to flow through the third series coil.

Furthermore, the above molten metal driving device may further include a case that houses the plurality of iron cores, in which the case may be provided with an air intake port for taking air into the case and an air discharge port for discharging the air in the case to an outside, and the air intake port and the air discharge port may be disposed so as to sandwich the plurality of iron cores.

Furthermore, in the above molten metal driving device, the air intake port may be connected with a blower.

Furthermore, in the above molten metal driving device, the plurality of iron cores may extend in parallel to each other, and the first yoke, the second yoke, and the third yoke may be disposed in parallel to each other.

Furthermore, in the above molten metal driving device, the plurality of iron cores may extend in parallel to each other, and the first yoke, the second yoke, and the third yoke may be bent along an extending direction of the plurality of iron cores.

Furthermore, in the above molten metal driving device, the plurality of iron cores may be annular iron cores, and may be disposed at intervals such that central axes of the iron cores are coaxial, and the first yoke, the second yoke, and the third yoke may be disposed inside the annular iron cores.

A molten metal stirring system according to an embodiment of the present invention includes: a furnace that stores molten metal; and the molten metal driving device disposed below the furnace.

A molten metal conveying system according to an embodiment of the present invention includes: a trough that conveys molten metal; and the molten metal driving device disposed so as to surround at least a lower side of the trough.

A continuous casting system according to an embodiment of the present invention includes: a mold having a cylindrical shape; and the molten metal driving device in which the mold is disposed inside the annular iron cores.

A molten metal driving method according to an embodiment of the present invention is a molten metal driving method for driving molten metal, the molten metal driving method including: a step of disposing a molten metal driving device having a magnetic field device so as to be adjacent to a furnace that stores molten metal, a trough that conveys the molten metal, or a mold; the magnetic field device including: a plurality of iron cores; a first yoke that couples the plurality of iron cores; a second yoke that is adjacent to the first yoke and couples the plurality of iron cores; a third yoke that is adjacent to the second yoke and couples the plurality of iron cores; a first coil and a second coil wound around at least one of the plurality of iron cores so as to sandwich the first yoke; a third coil and a fourth coil wound around at least one of the plurality of iron cores so as to sandwich the second yoke; and a fifth coil and a sixth coil wound around at least one of the plurality of iron cores so as to sandwich the third yoke, and a step of causing a first-phase current to flow through the first coil and the second coil to generate a magnetic field toward the first yoke, causing a second-phase current to flow through the third coil and the fourth coil to generate a magnetic field toward the second yoke, and causing a third-phase current to flow through the fifth coil and the sixth coil to generate a magnetic field toward the third yoke.

According to the present invention, it is possible to provide a molten metal driving device, a molten metal stirring system, a molten metal conveying system, a continuous casting system, and a molten metal driving method capable of obtaining a large driving force with low power consumption.

DETAILED DESCRIPTION

Hereinafter, embodiments according to the present invention will be described with reference to the drawings. Note that, in each drawing, components having equivalent functions are denoted by the same reference signs.

First Embodiment

A schematic configuration of a molten metal driving device 1 according to a first embodiment will be described with reference to FIG. 1. Note that, in FIG. 1, coils wound around iron cores 21 to 25 of a magnetic field device 2 are not illustrated.

Figure 1:
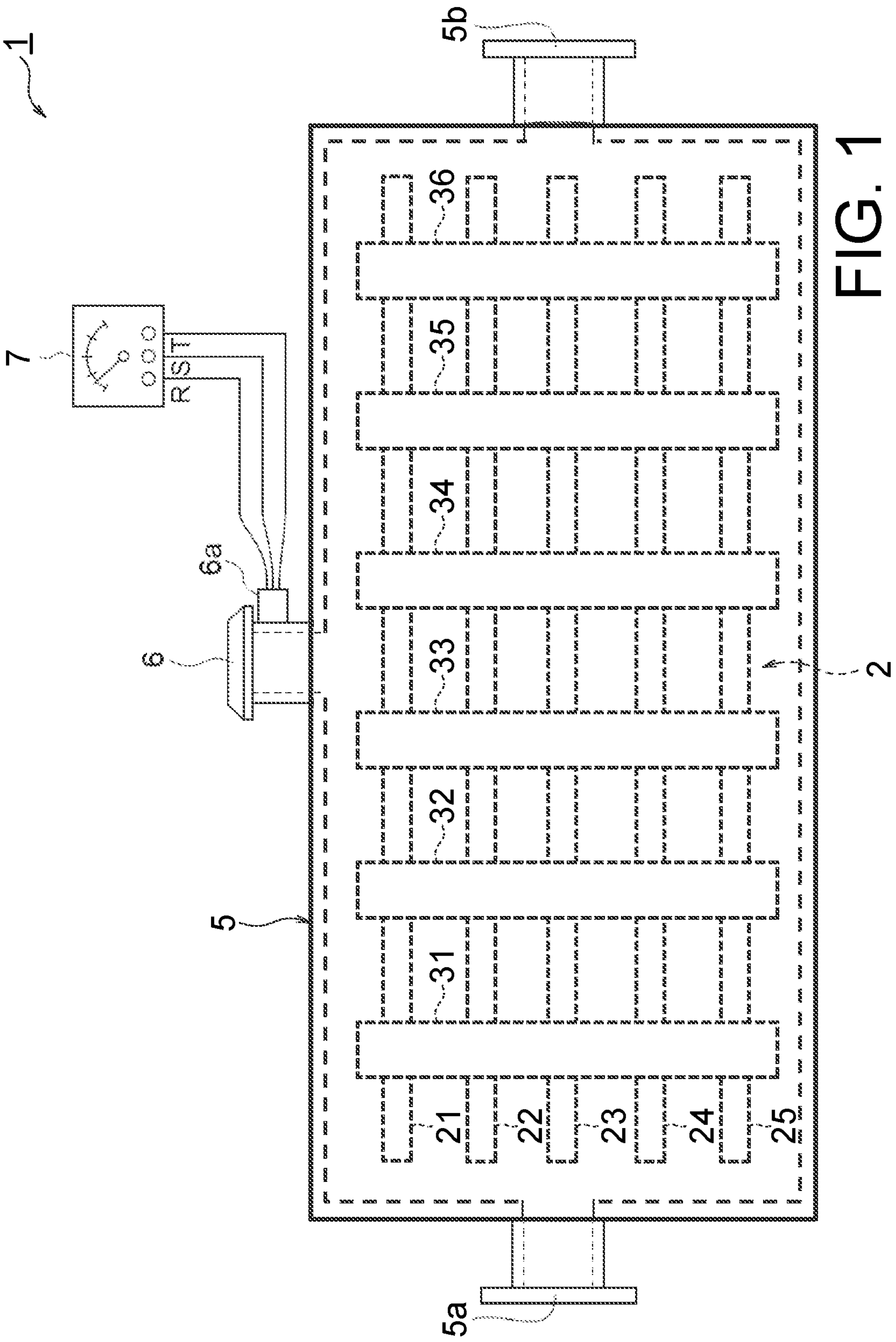
FIG. 1 is a partially see-through plan view of a molten metal driving device according to a first embodiment.

As illustrated in FIG. 1, the molten metal driving device 1 includes the magnetic field device 2, a case 5, a terminal box 6, and an AC power supply 7. The molten metal driving device 1 is configured to generate moving magnetic fields by the magnetic field device 2 to which three-phase AC is supplied from the AC power supply 7, and electromagnetically drive the molten metal by the moving magnetic fields.

Although described in detail later, the magnetic field device 2 is configured to generate moving magnetic fields (repulsive magnetic fields $H_R$, $H_S$, and $H_T$ described later) for driving the molten metal. The magnetic field device 2 is housed in the case 5. For example, the magnetic field device 2 is disposed at a predetermined position in the case 5 by an installation jig or with a mounting base (not illustrated). During the operation of the molten metal driving device 1, the magnetic field device 2 is cooled by the cooling air taken in from an air intake port 5*a*.

The case 5 is configured to house the magnetic field device 2. The material of the case 5 is not particularly limited, and is made of, for example, a refractory material or metal such as stainless steel.

The case 5 has the air intake port 5*a* and an air discharge port 5*b*. The air intake port 5*a* is provided to take air for cooling the magnetic field device 2 into the case 5. The air discharge port 5*b* is provided for discharging the air in the case 5 to the outside. In the present embodiment, the air intake port 5*a* is configured as a connection flange of a cold air supply air duct. Therefore, a blower (not illustrated) can be connected to the air intake port 5*a*, and the magnetic field device 2 can be forcibly air-cooled.

As illustrated in FIG. 1, the air intake port 5*a* and the air discharge port 5*b* are disposed so as to sandwich the iron cores 21 to 25 along the direction in which the iron cores 21 to 25 extend. In the present embodiment, the air intake port 5*a* and the air discharge port 5*b* are provided on opposed surfaces of the case 5 (surfaces orthogonal to the extending direction of the iron cores 21 to 25). As a result, the cooling air taken into the case 5 from the air intake port 5*a* passes along the iron cores 21 to 25 between the iron cores 21 to 25 and is then discharged from the air discharge port 5*b*. As described above, since the cooling air is discharged from the air discharge port 5*b* after efficiently cooling the iron cores 21 to 25, the cooling efficiency of the magnetic field device 2 can be greatly increased.

The terminal box 6 is provided in the case 5 as illustrated in FIG. 1. The terminal box 6 houses a terminal post (not illustrated). The terminal post is electrically connected to the coils of the magnetic field device 2. The terminal box 6 has a wiring introduction port 6*a* for introducing wiring for connecting the terminal post and the AC power supply 7.

The AC power supply 7 is a three-phase AC power supply, and outputs three-phase (R-phase, S-phase, T-phase) AC currents. The AC power supply 7 may be configured to vary the output current and/or the frequency in order to adjust the driving force of the molten metal.

<Magnetic Field Device 2>

Next, the configuration and operation of the magnetic field device 2 will be described in detail with reference to FIGS. 2 to 4.

Figures 2A, 2B:
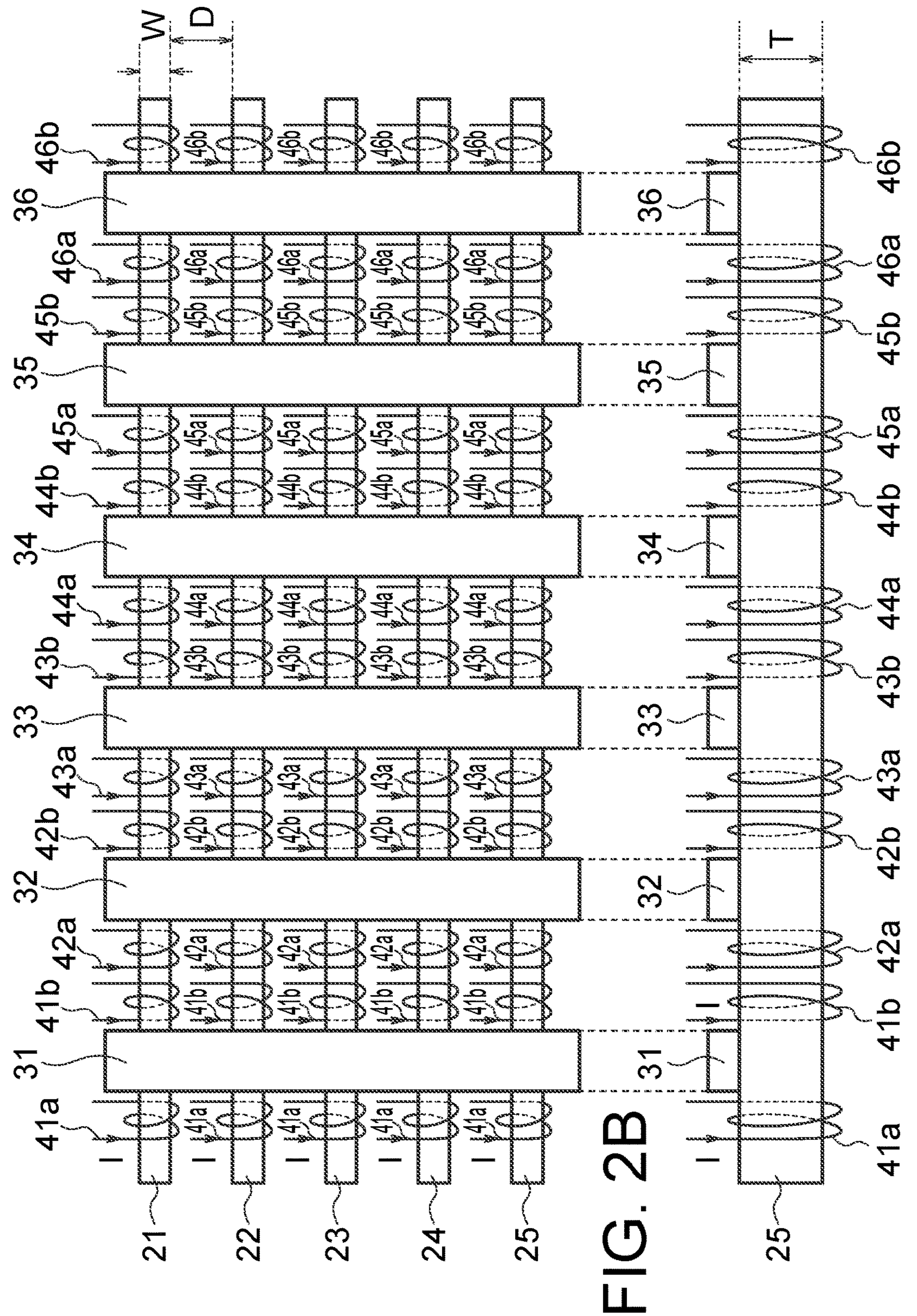
FIG. 2A is a plan view of a magnetic field device of the molten metal driving device according to the first embodiment.
FIG. 2B is a side view of the magnetic field device.

As illustrated in FIGS. 2A and 2B, the magnetic field device 2 includes a plurality of iron cores 21 to 25 disposed at intervals, a plurality of yokes 31 to 36, and a plurality of coils 41*a* to 46*a* and 41*b* to 46*b*.

The iron cores 21 to 25 are made of a ferromagnetic material, for example, a silicon steel plate or a carbon steel plate. The silicon steel plate is advantageous from the viewpoint of reducing the iron loss. However, as described later, according to the present embodiment, since the eddy current generated in the iron cores 21 to 25 during operation can be reduced as compared with the conventional case, it is possible to use a carbon steel sheet, which is advantageous in terms of cost. By using the carbon steel sheet, it is also possible to reduce the weight of the magnetic field device 2.

In the present embodiment, as illustrated in FIG. 2, the iron cores 21 to 25 have a thin plate shape or a square rod shape. Note that the shape of the iron cores 21 to 25 is not limited to a thin plate shape or a square rod shape, and may be, for example, a round rod shape. Furthermore, the number of iron cores is not limited to five, and may be any number. For example, the number of iron cores may be determined based on the size of the melting furnace in which the molten metal to be driven is stored.

As illustrated in FIGS. 2A and 2B, in the present embodiment, the iron cores 21 to 25 extend in parallel to each other. As a result, the cooling air taken in from the air intake port 5*a* flows between the iron cores along the iron core, so that the magnetic field device can be cooled extremely efficiently as compared with the conventional linear motor type magnetic field device (whose iron core is a single plate shape).

Note that, as illustrated in FIGS. 2A and 2B, in the iron cores 21 to 25, a thickness W in the direction in which the yokes 31 to 36 extend (vertical direction in FIGS. 2A and 2B) may be smaller than an interval D between the iron cores. As a result, the cooling efficiency of the iron cores by the air taken in from the air intake port 5*a* can be enhanced.

Furthermore, as illustrated in FIGS. 2A and 2B, in the iron cores 21 to 25, the thickness W in the direction in which the yokes 31 to 36 extends may be smaller than a thickness T in the direction orthogonal to the direction. As a result, the cooling efficiency of the iron cores by the air taken in from the air intake port 5*a* can be enhanced.

The yokes 31 to 36 are provided between two coils wound around the iron cores 21 to 25, and function as magnetic poles when the coils are energized as described later. Each yoke is made of, for example, iron, pure iron (SUY), an SS material, or an alloy such as Permendur.

Three yokes constitute one set. That is, the yokes 31 to 33 constitute a first set, and the yokes 34 to 36 constitute a second set. The yokes 31 and 34 correspond to the R phase, the yokes 32 and 35 correspond to the S phase, and the yokes 33 and 36 correspond to the T phase.

The yokes 31 to 36 couple the plurality of iron cores 21 to 25. In the present embodiment, the yokes 31 to 36 are disposed so as to be orthogonal to the plurality of iron cores 21 to 25. Not limited to such arrangement, the plurality of yokes may be disposed so as to obliquely cross the plurality of iron cores disposed in parallel.

The yokes 31 to 36 are disposed in parallel with each other in the order of the yokes 31, 32, 33, 34, 35, and 36. The yoke 32 is adjacent to the yoke 31, the yoke 33 is adjacent to the yoke 32, the yoke 34 is adjacent to the yoke 33, the yoke 35 is adjacent to the yoke 34, and the yoke 36 is adjacent to the yoke 35.

Note that, in the present embodiment, the yokes 31 to 36 are directly connected to the iron cores 21 to 25, but, not limited to such direct connection, the yokes 31 to 36 may be connected via a connection portion (not illustrated) to the iron cores 21 to 25. The connecting portion may be a protrusion provided on the iron cores 21 to 25, or may be a member separate from the iron cores or the yokes.

Furthermore, the number of yokes is not limited to six. For example, the number of yokes may be a multiple of 3, such as 9, 12, or the like. For example, the number of yokes may be determined based on the size of the melting furnace in which the molten metal to be driven is stored.

Furthermore, in FIGS. 2A and 2B, the yokes 31 to 36 protrudes from the iron cores 21 and 25 (iron cores located at ends among the plurality of iron cores disposed in parallel) in plan view, but, not limited to protrusion, the yokes may not protrude.

Next, the coils wound around the iron cores 21 to 25 will be described.

As illustrated in FIGS. 2A and 2B, a pair of coils is wound around each iron core so as to sandwich the yoke. For example, the coil 41*a* (first coil) and the coil 41*b* (second coil) are wound around each of the iron cores 21 to 25 so as to sandwich the yoke 31. Similarly, the coil 42*a* (third coil) and the coil 42*b* (fourth coil) are wound so as to sandwich the yoke 32, and the coil 43*a* (fifth coil) and the coil 43*b* (sixth coil) are wound so as to sandwich the yoke 33. In addition, in the present embodiment, the coil 44*a* (first coil) and the coil 44*b* (second coil) are wound so as to sandwich the yoke 34, the coil 45*a* (third coil) and the coil 45*b* (fourth coil) are wound so as to sandwich the yoke 35, and the coil 46*a* (fifth coil) and the coil 46*b* (sixth coil) are wound so as to sandwich the yoke 36.

In the present embodiment, the number of turns of each coil is the same in order to substantially equalize the strength of the magnetic field generated by each coil. Note that an insulating paper for insulation may be interposed between the coil and the iron core.

The coil 41*a* and the coil 41*b* are wound around the iron core 21 in opposite turns. Similarly, in the iron cores 22 to 25, the coil 41*a* and the coil 41*b* are wound in opposite turns. The coil 41*a* and the coil 41*b* of each iron core are connected in series. Therefore, during energization, current I flows in opposite directions through the coil 41*a* and the coil 41*b*, and magnetic fields in opposite directions are generated (see FIG. 4A).

Note that the coil 41*a* and the coil 41*b* may be wound in the same direction. In such case, the coil 41*a* and the coil 41*b* are connected in series so as to generate magnetic fields in directions opposite to each other.

Similarly to the coils 41*a* and 41*b*, the pairs of coils 42*a* and 42*b*, coils 43*a* and 43*b*, coils 44*a* and 44*b*, coils 45*a* and 45*b*, and coils 46*a* and 46*b*, which are wound so as to sandwich the yoke 32, the yoke 33, the yoke 34, the yoke 35, and the yoke 36, respectively, are also wound so as to generate magnetic fields in directions opposite to each other.

Both the coil 41*a* and the coil 41*b* are wound so as to generate a magnetic field H1 (described later) having substantially the same strength toward the yoke 31 when the R-phase current (first-phase current) flows. Similarly, both the coil 44*a* and the coil 44*b* are wound so as to generate the magnetic field H1 having substantially the same strength toward the yoke 34 when the R-phase current flows.

Both the coil 42*a* and the coil 42*b* are wound so as to generate a magnetic field H2 toward the yoke 32 when the S-phase current (second-phase current) flows. Similarly, both the coil 45*a* and the coil 45*b* are wound so as to generate the magnetic field H2 toward the yoke 35 when the S-phase current flows.

Both the coil 43*a* and the coil 43*b* are wound so as to generate a magnetic field H3 toward the yoke 33 when the T-phase current (third-phase current) flows. Similarly, both the coil 46*a* and the coil 46*b* are wound so as to generate the magnetic field H3 toward the yoke 36 when the T-phase current flows.

The pairs of coils described above are connected in series. For example, the pair of coils 41*a* and 41*b* wound around each of the iron cores 21 to 25 are connected in series to constitute a series coil 41. Similarly, the pair of coils 42*a* and 42*b* wound around each of the iron cores 21 to 25 are connected in series to constitute a series coil 42. The pair of coils 43*a* and 43*b* wound around each of the iron cores 21 to 25 are connected in series to constitute a series coil 43. The pair of coils 44*a* and 44*b* wound around each of the iron cores 21 to 25 are connected in series to constitute a series coil 44. The pair of coils 45*a* and 45*b* wound around each of the iron cores 21 to 25 are connected in series to constitute a series coil 45. The pair of coils 46*a* and 46*b* wound around each of the iron cores 21 to 25 are connected in series to constitute a series coil 46.

Figure 3:
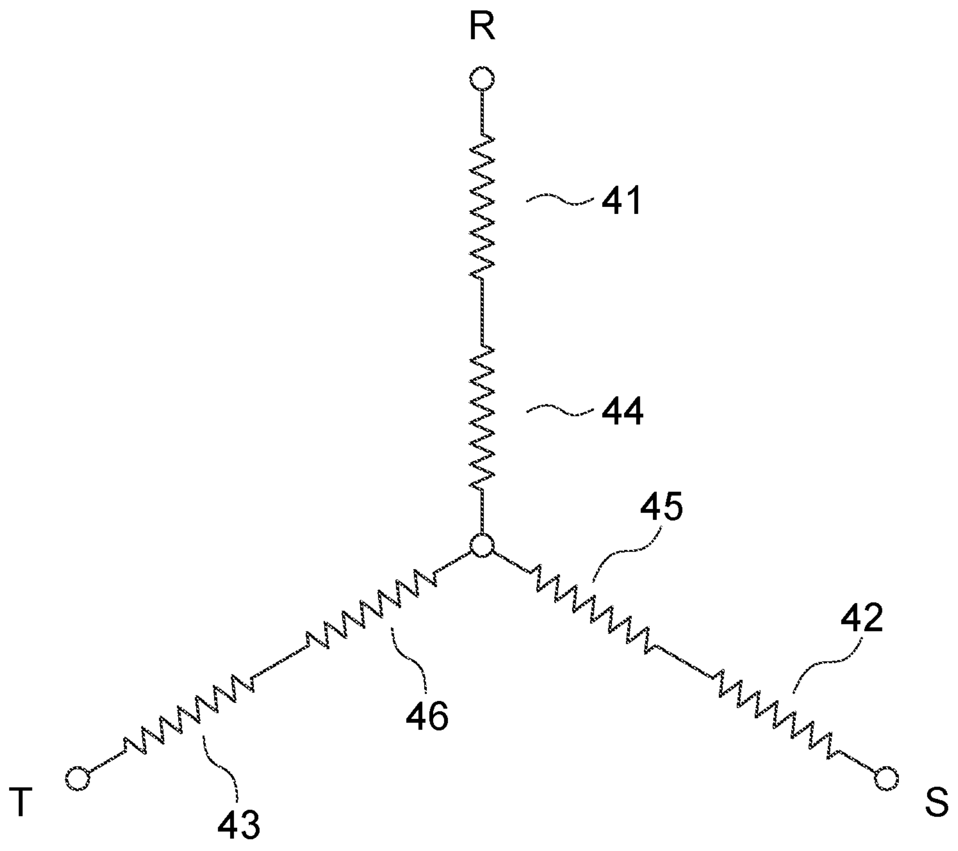
FIG. 3 is a connection diagram of a plurality of coils included in the magnetic field device of the molten metal driving device according to the first embodiment.

The series coils 41 to 46 are connected as illustrated in FIG. 3. That is, the series coil 41 and the series coil 44 are connected in series, the series coil 42 and the series coil 45 are connected in series, and the series coil 43 and the series coil 46 are connected in series. Then, the series coil 41 and the series coil 44 connected in series, the series coil 42 and the series coil 45 connected in series, and the series coil 43 and the series coil 46 connected in series are star-connected. The series coil 41, the series coil 42, and the series coil 43 are connected to an R-phase terminal, an S-phase terminal, and a T-phase terminal of the AC power supply 7, respectively. As a result, during the operation of the molten metal driving device 1, the R-phase current of the AC power supply 7 flows through the series coils 41 and 44, the S-phase current of the AC power supply 7 flows through the series coils 42 and 45, and the T-phase current of the AC power supply 7 flows through the series coils 43 and 46.

Note that the connection between the coils is not limited to the above, and other connection forms may be used as long as moving magnetic fields ($H_R$, $H_S$, $H_T$) described later are generated.

Furthermore, when one set of yokes (that is, only three yokes 31 to 33 for the yokes of the magnetic field device) is used, the series coil 41, the series coil 42, and the series coil 43 are star-connected.

In the magnetic field device 2 described above, each of the iron cores 21 to 25 is provided with a pair of coils so as to sandwich the yoke, but some coils may be omitted. For example, the pair of coils 41*a* and 41*b* may be provided only for the iron cores 21, 23, and 25, and the pair of coils 42*a* and 42*b* may be provided only for the iron cores 22 and 24.

<Operation of Magnetic Field Device 2>

Next, the operation of the magnetic field device 2 will be described with reference to FIGS. 4A and 4B.

Figure 4A:
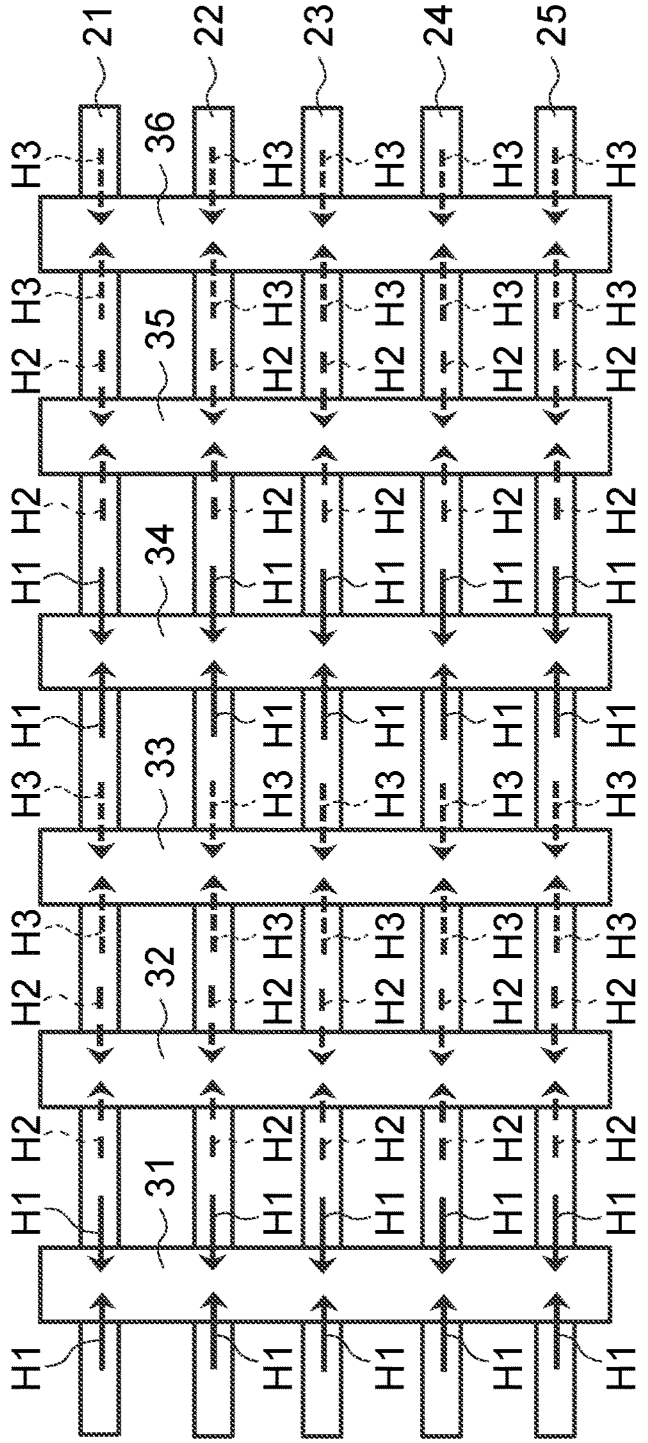
FIG. 4A is a plan view for explaining generation of magnetic fields by the magnetic field device of the molten metal driving device according to the first embodiment.
Figure 4B:
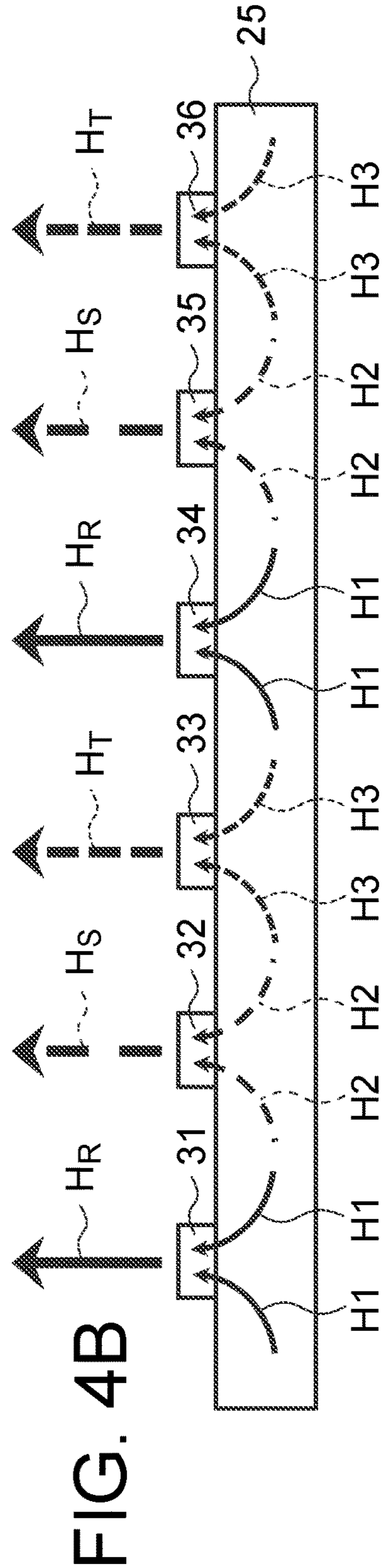
FIG. 4B is a side view for explaining generation of magnetic fields by the magnetic field device.

When the R-phase current of the AC power supply 7 flows through the series coil 41, as illustrated in FIG. 4A, magnetic fields H1 of substantially the same magnitude are generated in the coil 41*a* and the coil 41*b* in directions opposite to each other. Both the magnetic field H1 generated in the coil 41*a* and the magnetic field H1 generated in the coil 41*b* are directed to the yoke 31. Then, as illustrated in FIG. 4B, the two magnetic fields H1 collide and repel at the yoke 31, and the repulsive magnetic field $H_R$ thus generated is emitted from the yoke 31 toward the outside. The same applies to the series coil 44 through which the R-phase current flows, and the repulsive magnetic field $H_R$ is emitted from the yoke 34 toward the outside.

The same applies to the S phase. That is, when the S-phase current of the AC power supply 7 flows through the series coil 42, magnetic fields H2 of substantially the same magnitude are generated in the coil 42*a* and the coil 42*b* in directions opposite to each other. Both the magnetic field H2 generated in the coil 42*a* and the magnetic field H2 generated in the coil 42*b* are directed to the yoke 32, and the two magnetic fields H2 collide and repel at the yoke 32. The repulsive magnetic field $H_S$ thus generated is emitted from the yoke 32 toward the outside. The same applies to the series coil 45 through which the S-phase current flows, and the repulsive magnetic field $H_S$ is emitted from the yoke 35 toward the outside.

The same applies to the T phase. That is, when the T-phase current of the AC power supply 7 flows through the series coil 43, magnetic fields H3 of substantially the same magnitude are generated in the coil 43*a* and the coil 43*b* in directions opposite to each other. Both the magnetic field H3 generated in the coil 43*a* and the magnetic field H3 generated in the coil 43*b* are directed to the yoke 33, and the two magnetic fields H3 collide and repel at the yoke 33. The repulsive magnetic field $H_T$ thus generated is emitted from the yoke 33 toward the outside. The same applies to the series coil 46 through which the T-phase current flows, and the repulsive magnetic field $H_T$ is emitted from the yoke 36 toward the outside.

The repulsive magnetic field $H_R$, the repulsive magnetic field $H_S$, and the repulsive magnetic field $H_T$ are repeatedly emitted from the magnetic field device 2 in this order by the R-phase current, the S-phase current, and the T-phase current supplied from the AC power supply 7. As a result, the molten metal above the magnetic field device 2 is driven in the direction from the yoke 31 toward the yoke 36.

<Operation and Effect of Molten Metal Driving Device 1>

As described above, in the molten metal driving device 1, the magnetic field device 2 can emit strong repulsive magnetic fields. As a result, the magnetic field device 2 can generate strong moving magnetic fields without applying a large current to the coils or increasing the number of turns of the coils. Therefore, according to the molten metal driving device 1 of the present embodiment, a large driving force can be obtained with low power consumption.

In addition, in the molten metal driving device 1, since each of the iron cores 21 to 25 is thinner than the iron core of the conventional magnetic field device (a single plate-shaped iron core), it is possible to reduce the eddy current generated in each of the iron cores 21 to 25 when the coils are energized. Thus, as the material of the iron cores 21 to 25, a general-purpose carbon steel plate can be used instead of laminated thin silicon steel plates having a low iron loss. Therefore, the costs (design cost, material cost, manufacturing cost) of the magnetic field device 2 can be reduced, and the weight of the molten metal driving device 1 can be reduced.

In addition, in the molten metal driving device 1, since the iron core of the magnetic field device 2 includes the plurality of iron cores 21 to 25 disposed in parallel at intervals, the surface areas of the iron cores of the magnetic field device 2 increase. For this reason, the heat dissipation characteristics can be significantly improved as compared with the conventional case. As a result, according to the present embodiment, it is possible to cool the magnetic field device by air cooling, whereas, in the conventional molten metal stirring device, it is indispensable to cool the magnetic field device by water cooling. In the case of the water-cooling type, in order to prevent clogging of the pipeline, maintenance costs such as pretreatment of cooling water such as water softening treatment and periodic removal of algae are enormous. According to the present embodiment, such a maintenance cost can be reduced. In addition, the molten metal driving device 1 can be downsized.

<Molten Metal Stirring System>

As an application example of the molten metal driving device 1 according to the first embodiment, a molten metal stirring system 1100 will be described with reference to FIG. 5. The molten metal stirring system 1100 includes a furnace 100 that stores molten metal, and the molten metal driving device 1 disposed below the furnace 100. In this example, the molten metal driving device 1 has substantially the same size as the bottom wall of the furnace 100.

The furnace 100 is, for example, a melting furnace that melts a non-ferrous metal such as aluminum or a holding furnace that holds molten metal. Note that the nonferrous metal may be, for example, Al, Cu, Zn, or an alloy of at least two of Al, Cu, and Zn, or a Mg alloy.

Figure 5:
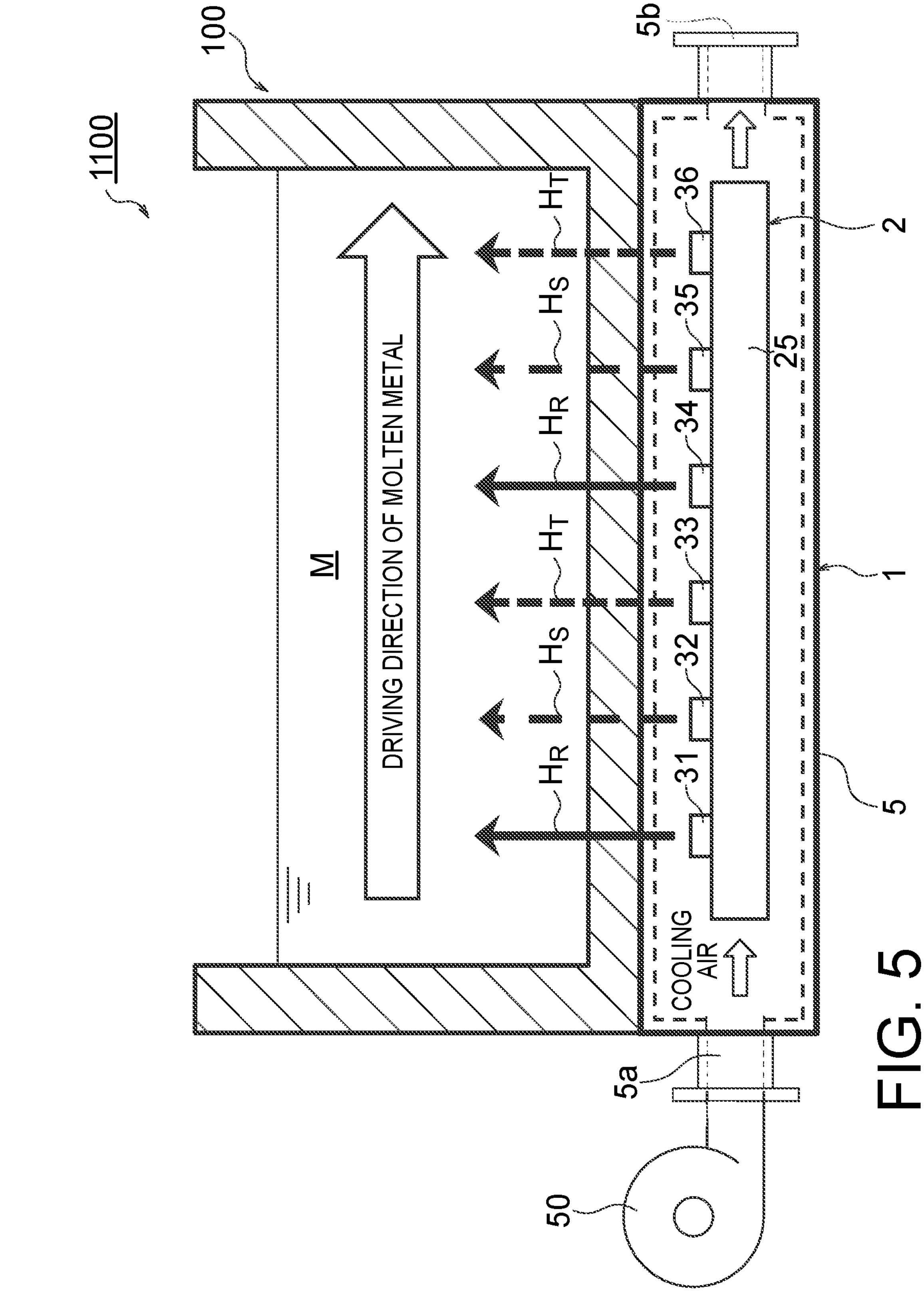
FIG. 5 is a diagram illustrating a first example of a molten metal stirring system including the molten metal driving device according to the first embodiment.

In FIG. 5, the furnace 100 is installed on the molten metal driving device 1. Not limited to such installation, the molten metal driving device 1 may be installed, for example, in a housing space (not illustrated) provided below the placement surface of the furnace 100.

As illustrated in FIG. 5, a blower 50 is attached to the air intake port 5*a* of the case 5. The magnetic field device 2 is forcibly cooled by the cooling air sent by the blower 50 into the case 5.

In the molten metal stirring system 1100, molten metal M in the furnace 100 is driven along the direction of the arrow in FIG. 5 (that is, the direction from the yoke 31 to the yoke 36) by the repulsive magnetic fields $H_R$, $H_S$, and $H_T$ sequentially emitted by the three-phase AC supplied from the AC power supply 7. The driven molten metal M hits the side wall of the furnace 100, spreads vertically and horizontally along the side wall, and then diffuses in a direction opposite to the driving direction. As a result, the molten metal M is stirred in the furnace 100.

Figure 6:
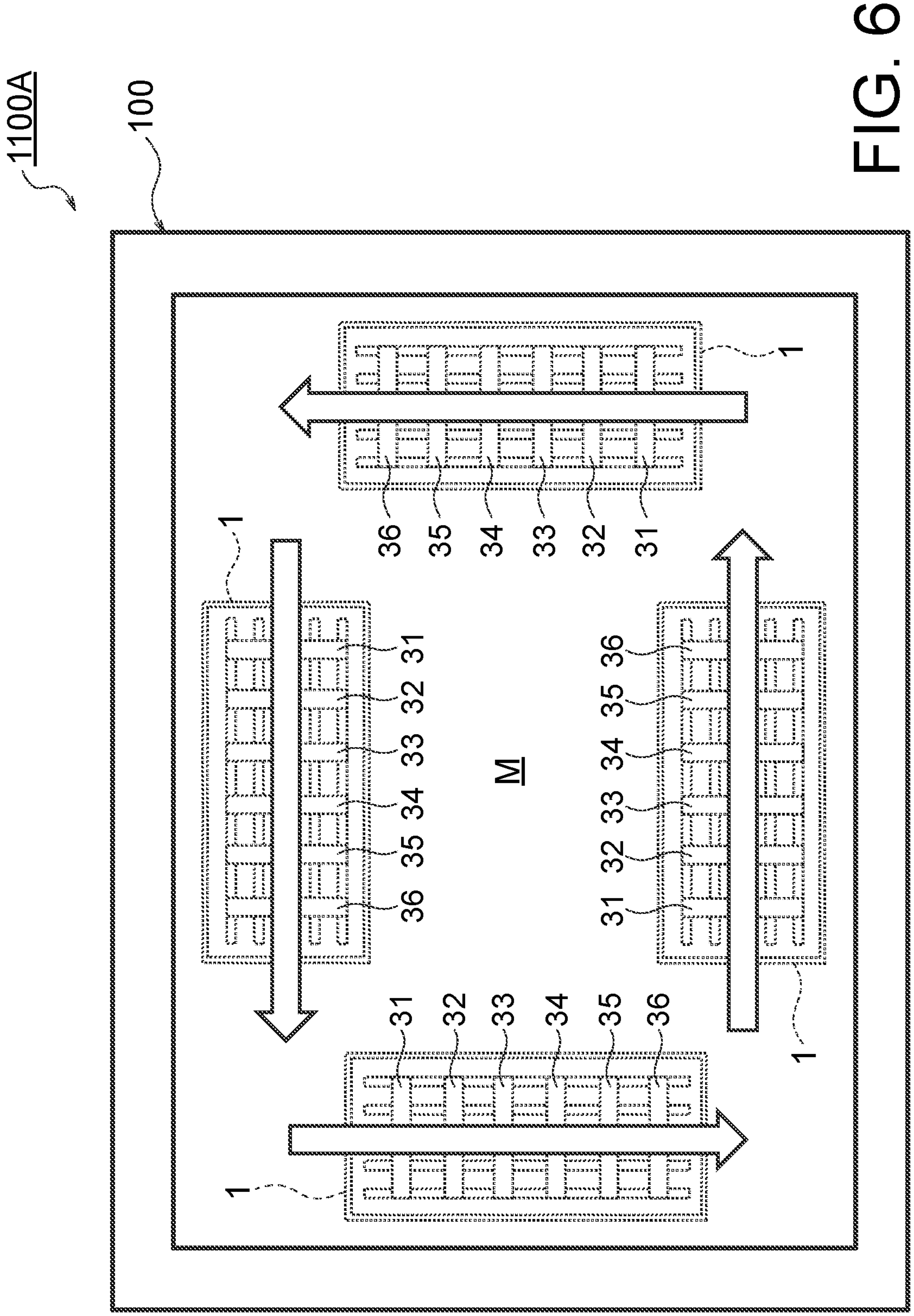
FIG. 6 is a diagram illustrating a second example of the molten metal stirring system including the molten metal driving device according to the first embodiment.

Next, another application example (molten metal stirring system 1100A) of the molten metal driving device 1 will be described with reference to FIG. 6. In this application example, a plurality of molten metal driving devices 1 are disposed below a furnace 100 larger than the molten metal driving device 1. In this example, the plurality of molten metal driving devices 1 are disposed along the side walls of the furnace 100 in plan view. As a result, since the molten metal M in the furnace 100 is driven along the side walls of the furnace 100, the molten metal M is efficiently stirred in the furnace 100.

Note that the molten metal driving device 1 may be disposed at a corner portion of the furnace 100 along a desired stirring direction.

Second Embodiment

Figure 7:
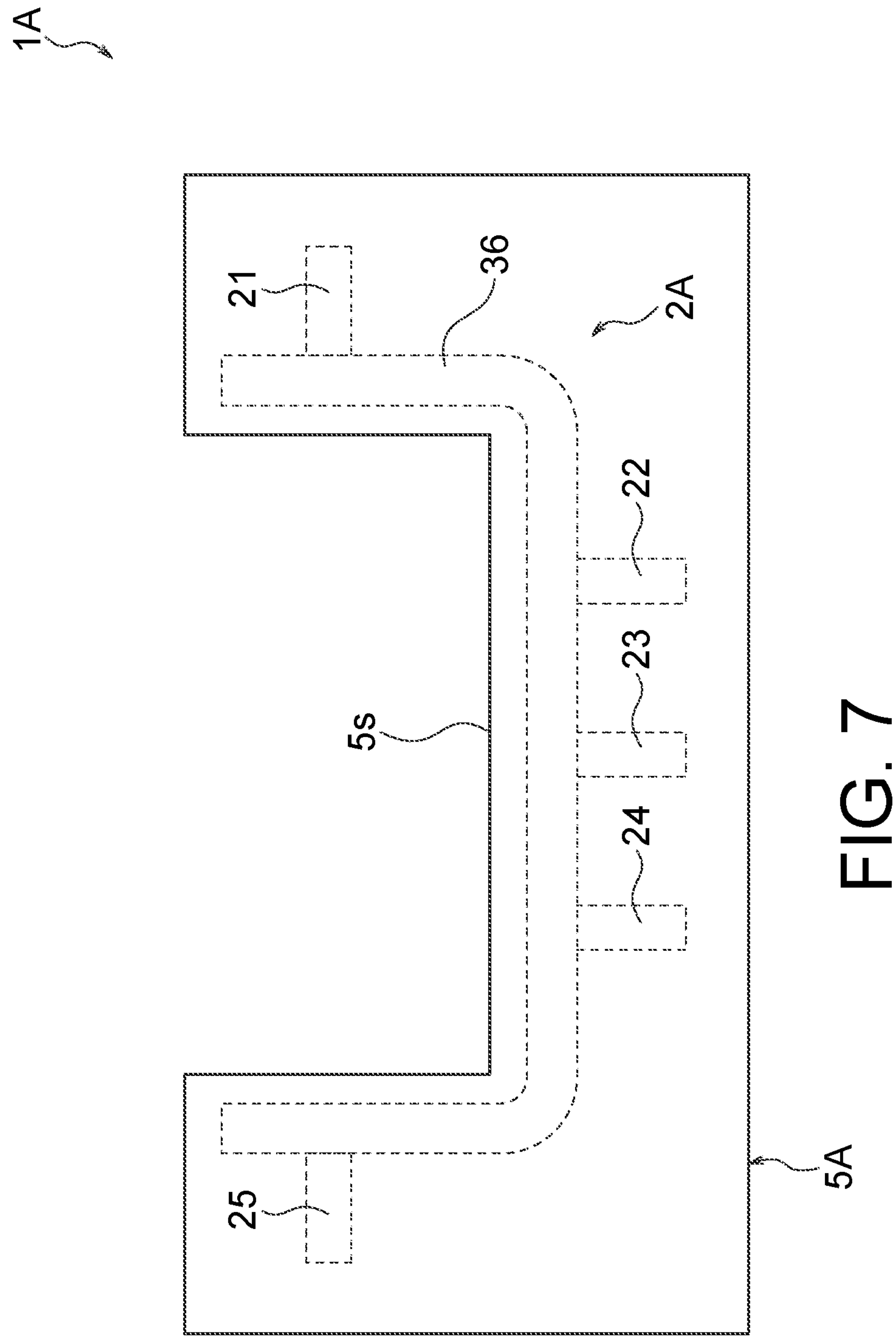
FIG. 7 is a partially see-through side view of a molten metal driving device according to a second embodiment.

Next, a molten metal driving device 1A according to a second embodiment will be described with reference to FIG. 7. FIG. 7 is a partially see-through side view of the molten metal driving device 1A including a magnetic field device 2A. Note that, in FIG. 7, coils wound around the iron cores of the magnetic field device 2A are not illustrated.

One of the differences between the first embodiment and the second embodiment is that the yokes 31 to 36 are bent in a U shape in the second embodiment. Hereinafter, the second embodiment will be described focusing on the differences.

The molten metal driving device 1A includes the magnetic field device 2A, a case 5A, the terminal box 6, and the AC power supply 7. Since the terminal box 6 and the AC power supply 7 are the same as those described in the first embodiment, detailed description thereof will be omitted.

The magnetic field device 2A has the same components as those of the magnetic field device 2 described in the first embodiment. However, as illustrated in FIG. 7, in the magnetic field device 2A, the yokes 31 to 36 are bent in a U shape. Specifically, the yokes 31 to 36 are bent between the iron core 21 and the iron core 22 and between the iron core 24 and the iron core 25 along the extending direction of the iron cores 21 to 25. As a result, the magnetic field device 2A has a U shape in a side view, and a housing space is formed. In this housing space, a molten metal conveyance path (a trough 200 to be described later) or the furnace 100 is housed.

Note that the number of yokes may be increased or decreased according to the conveying distance of the molten metal (the length of the trough). Furthermore, the number of iron cores may be increased or decreased according to the width of the trough or the like.

As illustrated in FIG. 7, the case 5A is configured to house the magnetic field device 2A in accordance with the shape of the magnetic field device 2A having a U-shape in a side view. A trough 200 that conveys the molten metal is placed on an upper surface 5*s* of the case. Note that the material of the case 5A is not particularly limited, and is made of, for example, a refractory material or metal such as stainless steel.

Although not illustrated, the air intake port 5*a* and the air discharge port 5*b* are provided at both ends of the case 5A (the distal end side and the base end side of the trough 200), respectively. As a result, similarly to the first embodiment, the cooling air passes along the iron cores 21 to 25 between the iron cores, and the iron cores 21 to 25 can be efficiently cooled.

Figure 8:
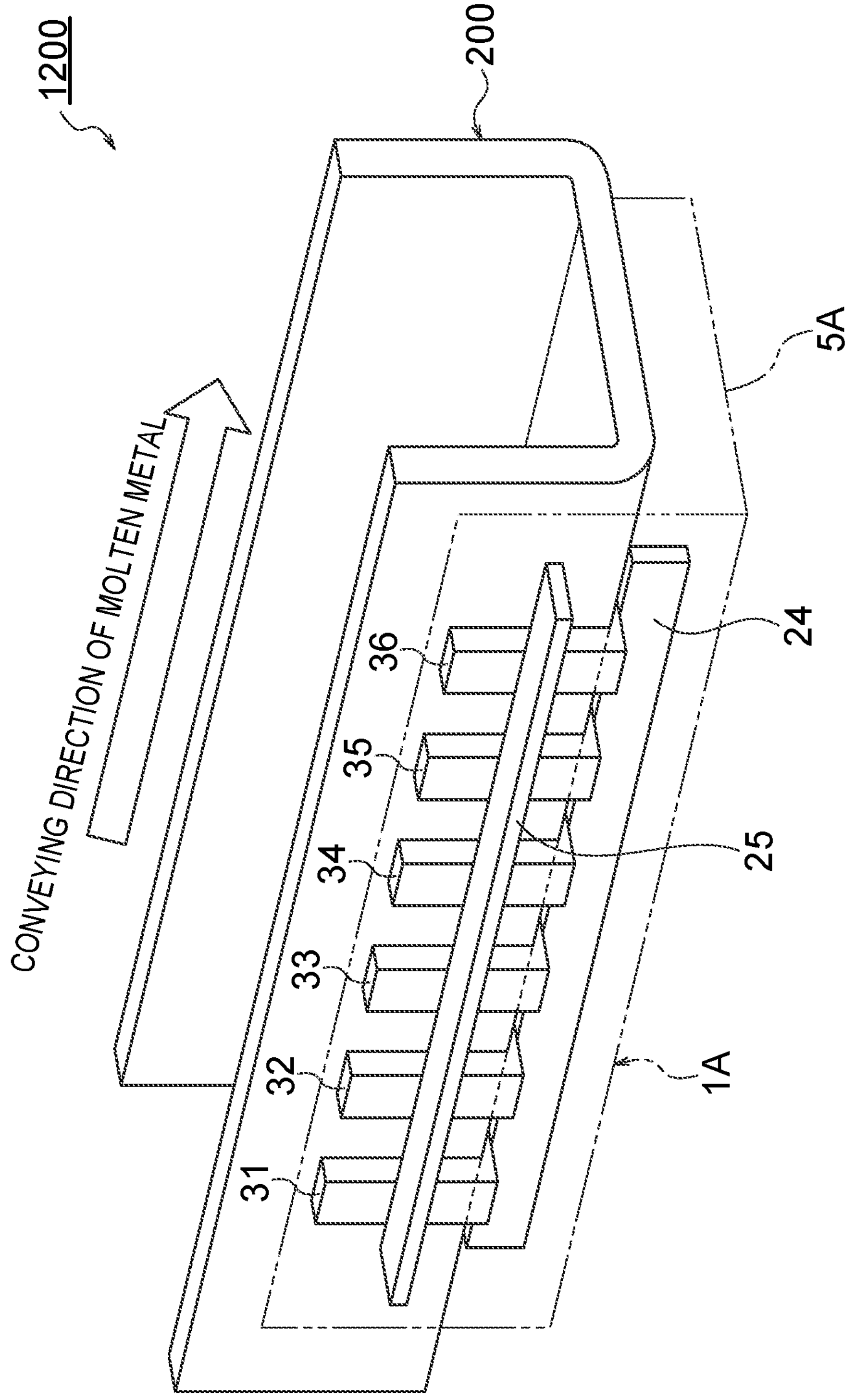
FIG. 8 is a perspective view illustrating an example of a molten metal conveying system including the molten metal driving device according to the second embodiment.
Figure 9:
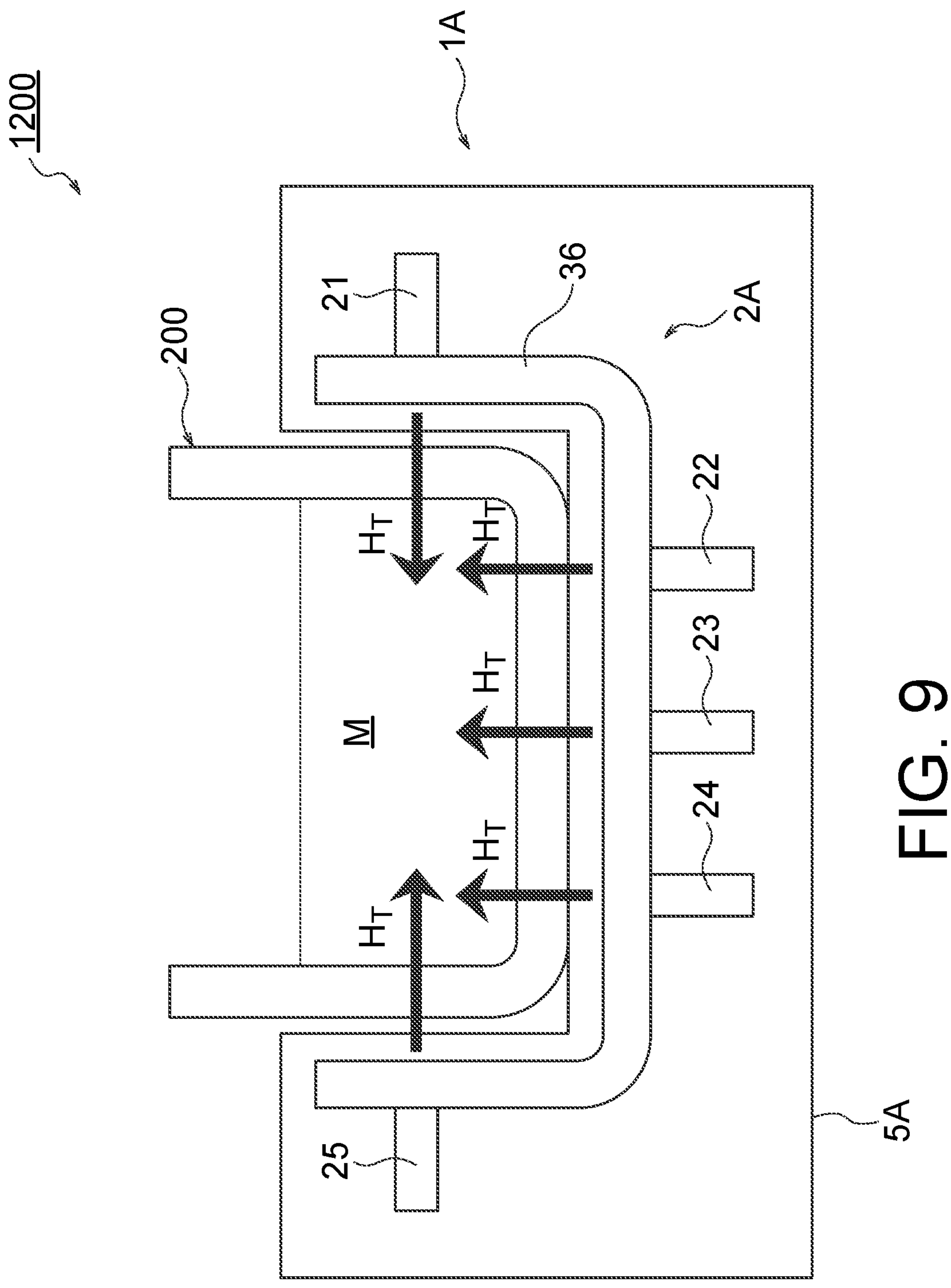
FIG. 9 is a side view for explaining generation of magnetic fields by a magnetic field device of the molten metal driving device according to the second embodiment.

FIG. 8 illustrates a molten metal conveying system 1200 in which the trough 200 is disposed in a housing space defined by the case 5A (magnetic field device 2A). Note that, in FIG. 8, coils wound around the iron cores of the magnetic field device 2A are not illustrated. FIG. 9 is a side view for explaining generation of magnetic fields by the magnetic field device 2A of the molten metal driving device 1A. This drawing illustrates how the repulsive magnetic field $H_T$ is emitted from the yoke 36 toward the trough 200. Similarly to the magnetic field device 2 of the first embodiment, in accordance with the supply of the three-phase AC, the repulsive magnetic field $H_R$, the repulsive magnetic field $H_S$, and the repulsive magnetic field $H_T$ are repeatedly emitted from the magnetic field device 2A toward the outside in this order. As a result, the molten metal M in the trough 200 is conveyed in the direction from the yoke 31 toward the yoke 36.

In the present embodiment, the iron core 21 and the iron core 25 are disposed along the side walls of the trough 200. Therefore, even when the conveyance amount of the molten metal is large, the driving force can be applied to the molten metal relatively far from the bottom wall of the trough 200, and the molten metal can be efficiently conveyed.

<Example of Use of Molten Metal Conveying System>

Figure 10:
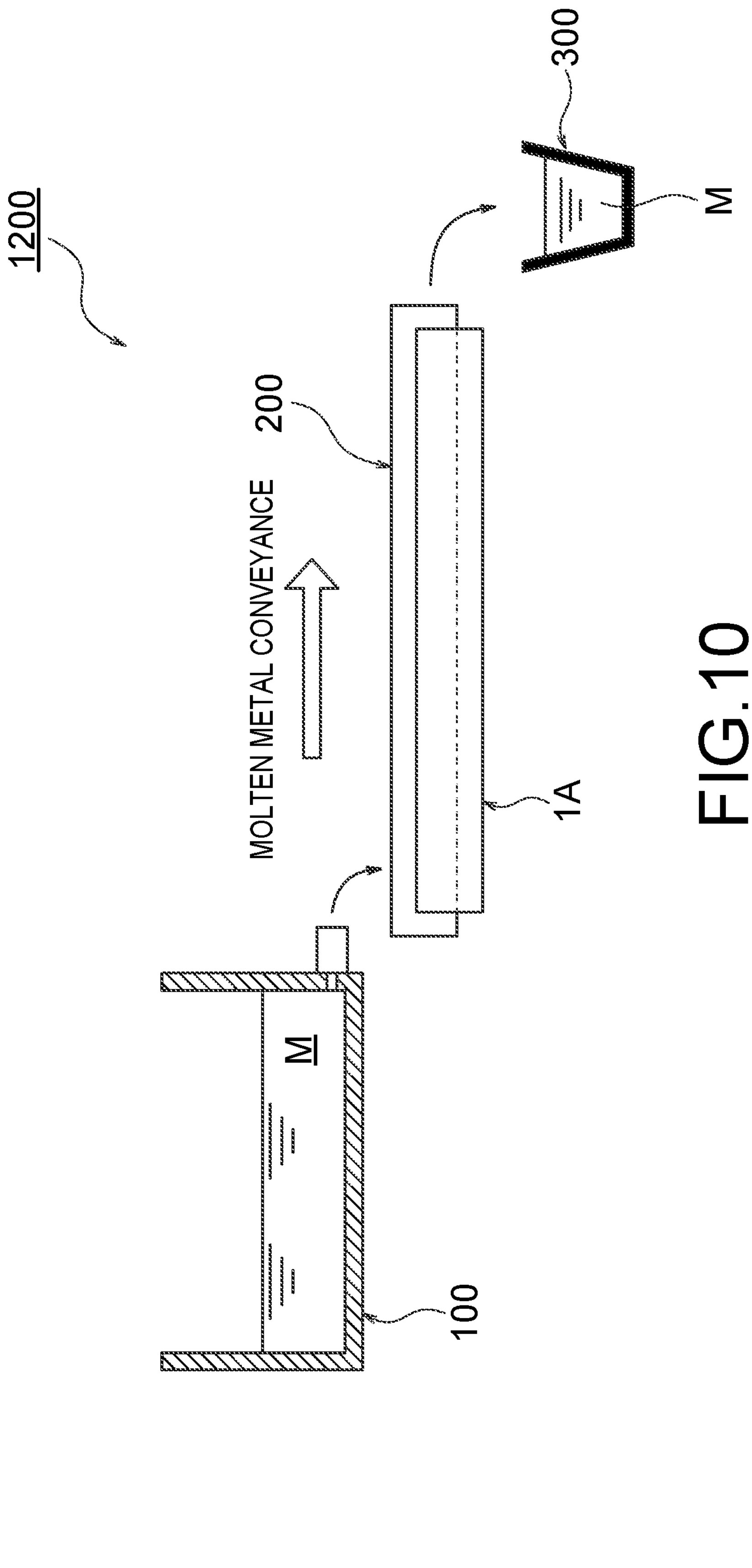
FIG. 10 is a diagram illustrating an application example of the molten metal conveying system including the molten metal driving device according to the second embodiment.
Figure 11:
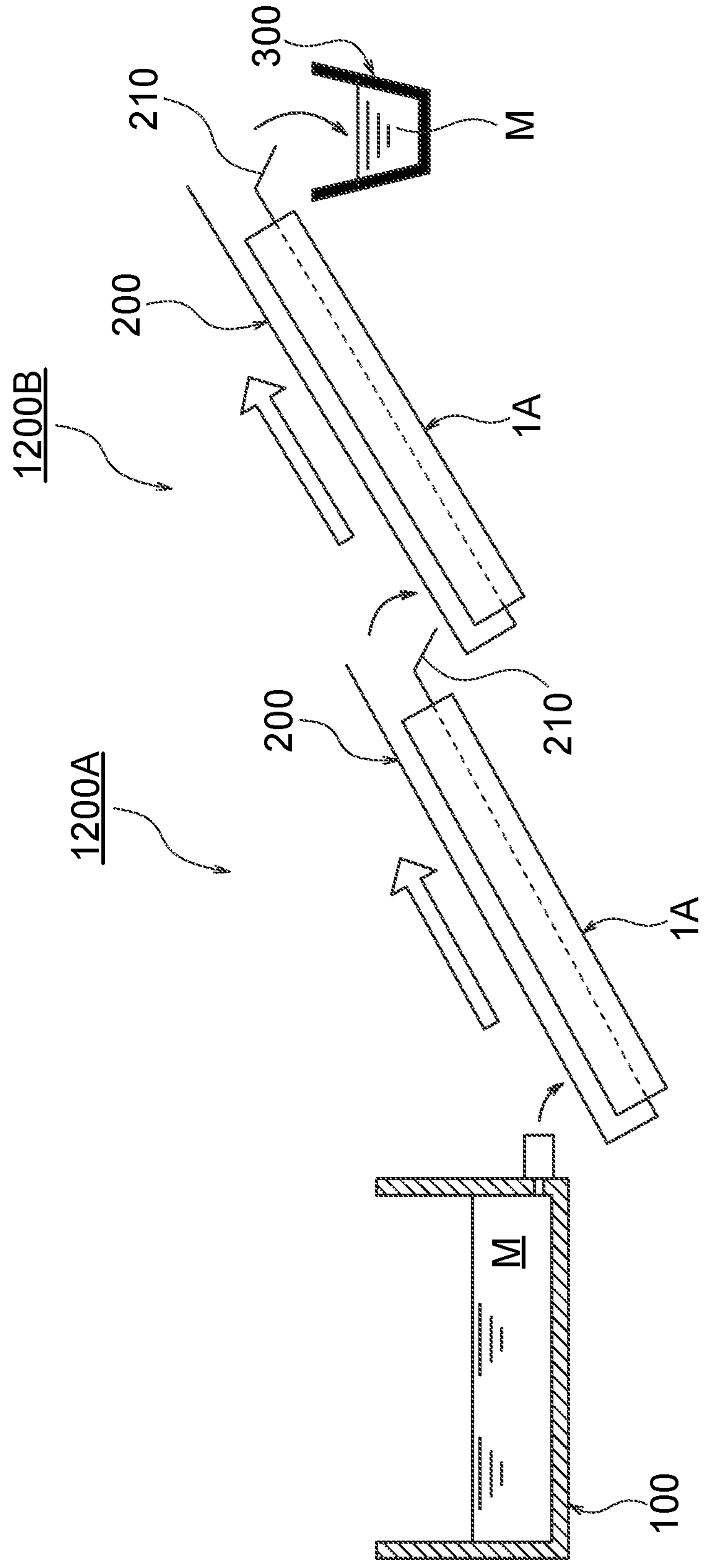
FIG. 11 is a diagram illustrating another application example of the molten metal conveying system including the molten metal driving device according to the second embodiment.

FIGS. 10 and 11 illustrate an example of a usage mode of the molten metal conveying system 1200. In the example of FIG. 10, the molten metal M in the furnace 100 is poured out from the trough 200, conveyed by the molten metal driving device 1A along the trough 200 installed horizontally, and then poured into a container 300.

In the example of FIG. 11, the trough 200 is installed in what is called an inclined state in which the distal end side of the trough 200 is lifted higher than the base end side. A guide plate 210 is provided at the distal end of the trough 200. In the case of this example, the molten metal M is conveyed so as to rise in the trough 200 against gravity.

In addition, in the example of FIG. 11, two molten metal conveying systems 1200A and 1200B are connected in series. The molten metal M from the furnace 100 is conveyed upward by the molten metal conveying system 1200A by one stage and sent to the molten metal conveying system 1200B, and the molten metal M is further conveyed upward by the molten metal conveying system 1200B by one stage. As a result, the molten metal M in the furnace 100 can be moved to the container 300 located at a position higher than the furnace 100 by two stages.

Note that three or more molten metal conveying systems 1200 may be linked in series. As a result, the conveying distance of the molten metal in the horizontal direction can be increased, and the conveying height can be further increased.

Third Embodiment

Figure 12:
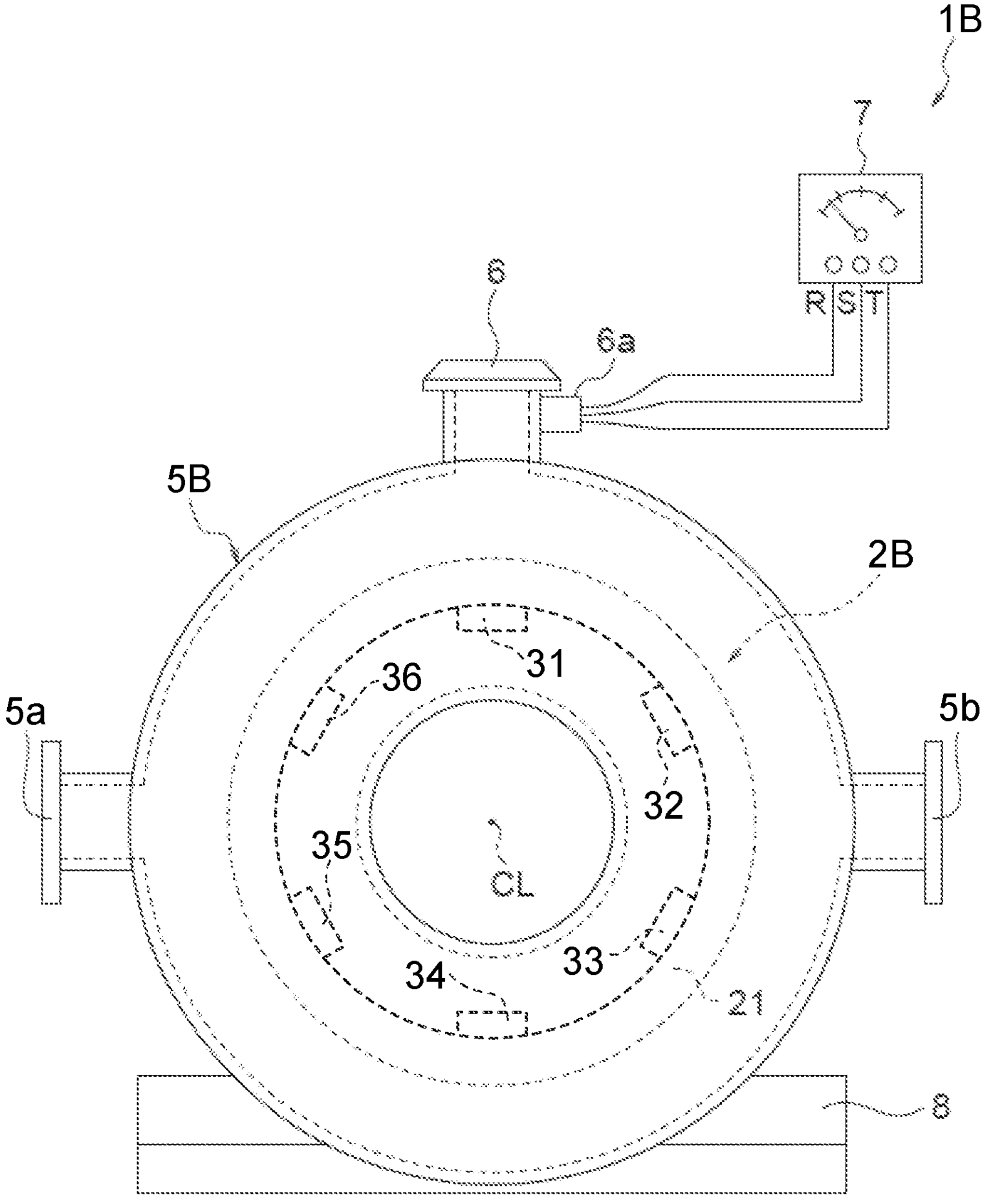
FIG. 12 is a partially see-through front view of a molten metal driving device according to a third embodiment.
Figure 13:
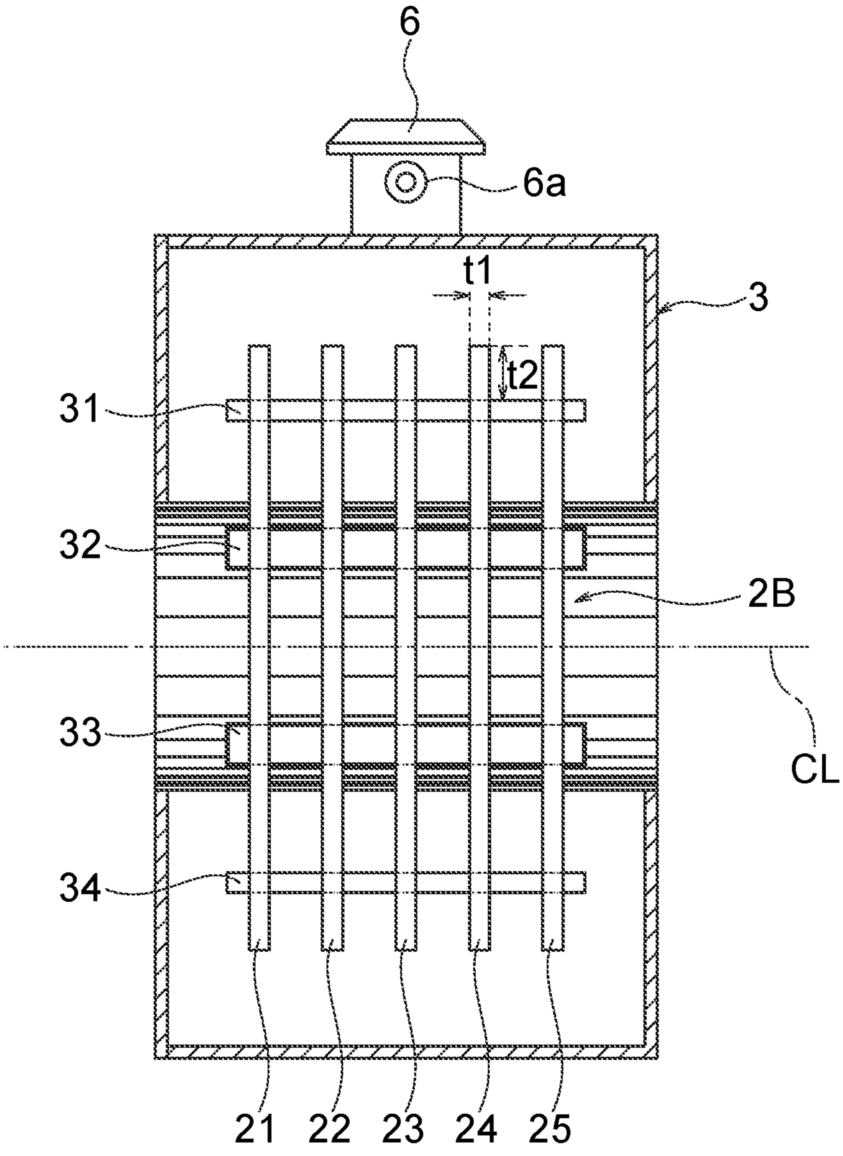
FIG. 13 is a partially see-through side sectional view of the molten metal driving device according to the third embodiment.
Figure 14:
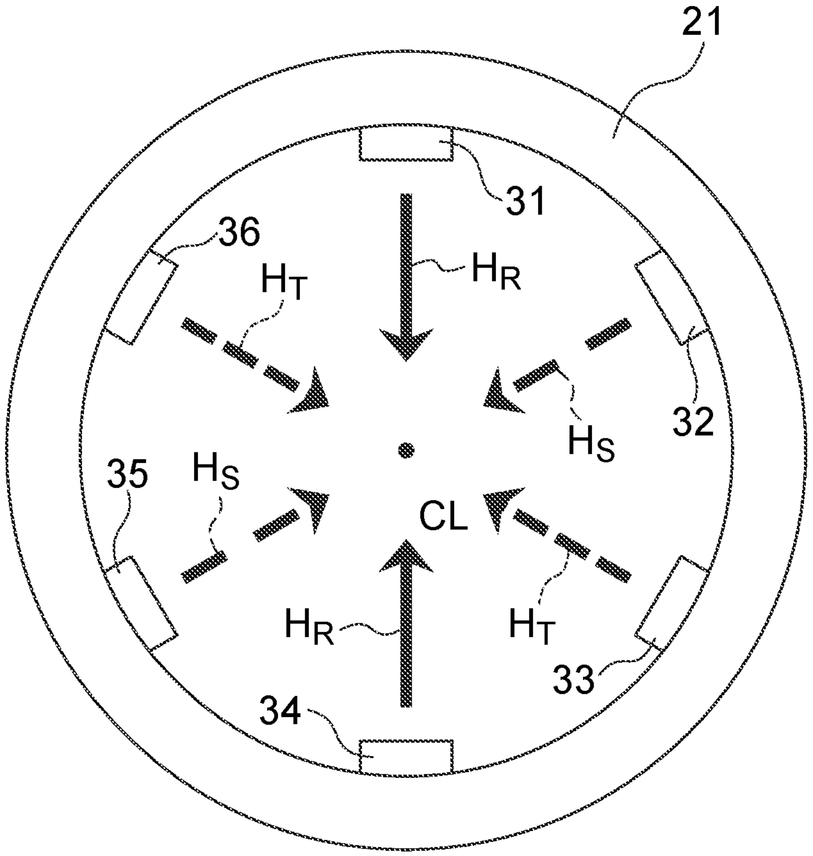
FIG. 14 is a front view for explaining generation of magnetic fields by a magnetic field device of the molten metal driving device according to the third embodiment.

Next, a molten metal driving device 1B according to a third embodiment will be described with reference to FIGS. 12 to 14. FIG. 12 is a partially see-through front view of the molten metal driving device 1B including a magnetic field device 2B. FIG. 13 is a partial side sectional view of the molten metal driving device 1B. FIG. 14 is a front view for explaining generation of magnetic fields by the magnetic field device 2B of the molten metal driving device 1B. Note that, in FIGS. 12 to 14, coils wound around the iron cores of the magnetic field device 2B are not illustrated.

One of the differences between the first embodiment and the third embodiment is that the iron cores 21 to 25 are annular iron cores in the third embodiment. That is, the magnetic field device 2B of the present embodiment corresponds to the magnetic field device 2 of the first embodiment in which both ends of the iron cores (the left end and the right end of the iron cores 21 to 25 in FIG. 2) are connected to constitute annular iron cores 21 to 25. More specifically, the magnetic field device 2B of the third embodiment corresponds to the magnetic field device 2 of the first embodiment in which the iron cores 21 to 25 are rounded in an annular shape such that the yokes 31 to 36 are on the inner side. Hereinafter, the third embodiment will be described focusing on the differences.

The molten metal driving device 1B includes the magnetic field device 2B, a case 5B, the terminal box 6, the AC power supply 7, and a mounting base 8. Since the terminal box 6 and the AC power supply 7 are the same as those described in the first embodiment, detailed description thereof will be omitted. The mounting base 8 is a support base for supporting and fixing the cylindrical case 5B in which the magnetic field device 2B is housed.

The magnetic field device 2B has the same components as those of the magnetic field device 2 described in the first embodiment. However, the iron cores 21 to 25 are configured as annular iron cores as described above. As illustrated in FIG. 13, the annular iron cores 21 to 25 are disposed at intervals such that respective central axes CL are coaxial.

As illustrated in FIG. 12, the yokes 31 to 36 are disposed inside the annular iron cores 21 to 25. In the present embodiment, the yoke 31 faces the yoke 34, the yoke 32 faces the yoke 35, and the yoke 33 faces the yoke 36.

Note that, from the viewpoint of reducing leakage of magnetic flux, it is preferable that the annular iron cores 21 to 25 are closed. However, provision of a gap in a part of the annular iron core is not excluded and the gap may be provided.

The annular iron cores 21 to 25 have, for example, a planar shape corresponding to the shape of a mold (cast object). When the molten metal driving device 1B is provided in a mold for casting a billet, the iron cores 21 to 25 have an annular shape. When the molten metal driving device 1B is provided in a mold for casting a slab, the iron cores 21 to 25 have a square annular shape.

Note that, in the present embodiment, as illustrated in FIG. 13, the annular iron cores 21 to 25 are disposed at equal intervals, but may be disposed at unequal intervals.

Furthermore, the annular iron cores 21 to 25 may be thin. As illustrated in FIG. 13, the annular iron cores 21 to 25 may have a thickness t1 in a direction along the central axis CL (first direction) smaller than a thickness t2 in a direction orthogonal to the first direction (second direction). As a result, the cooling efficiency of the magnetic field device 2B can be further improved, and the iron loss can be further reduced. It is preferable to set the thicknesses of the annular iron core in the first and second directions based on the magnetic saturation value of the annular iron core so that a desired magnetomotive force can be secured.

As illustrated in FIGS. 12 and 13, the case 5B is configured to house the magnetic field device 2B in accordance with the shape of the magnetic field device 2B having a substantially cylindrical shape. The magnetic field device 2B is housed in the case 5B such that an inner cylindrical portion of the case 5B is inserted into the annular iron cores 21 to 25. A spacer (not illustrated) made of an insulating material is interposed between the annular iron cores 21 to 25 and the inner cylindrical portion so that the annular iron cores 21 to 25 maintain a predetermined distance from the inner cylindrical portion of the case 5B. Then, a stud bolt (not illustrated) is provided so as to penetrate the spacer along the direction of the central axis CL of the magnetic field device 2B. Both ends of the stud bolt are fixed to the case 5B, whereby the magnetic field device 2B is fixed in the case 5B.

In the present embodiment, as illustrated in FIG. 12, the air intake port 5*a* and the air discharge port 5*b* are provided in the case 5B. As a result, similarly to the first embodiment, the cooling air passes along the annular iron cores 21 to 25 between the iron cores, and the annular iron cores 21 to 25 can be efficiently cooled.

Note that, in the present embodiment, the magnetic field device 2B is installed sideways (that is, such that the central axis CL of the annular iron cores 21 to 25 is in the horizontal direction). Not limited to such installation, the molten metal driving device 1B may be configured such that the magnetic field device 2B is installed vertically (that is, such that the central axis CL is in the vertical direction).

As illustrated in FIG. 14, the magnetic field device 2B of the present embodiment repeatedly emits the repulsive magnetic field $H_R$, the repulsive magnetic field $H_S$, and the repulsive magnetic field $H_T$ in this order toward the central axis CL in accordance with the three-phase AC current supplied from the AC power supply 7. More specifically, the repulsive magnetic field $H_R$ is emitted from the yokes 31 and 34 toward the central axis CL by the supply of the R-phase current. Then, the repulsive magnetic field $H_S$ is emitted from the yokes 32 and 35 toward the central axis CL by the supply of the S-phase current.

Subsequently, the repulsive magnetic field $H_T$ is emitted from the yokes 33 and 36 toward the central axis CL by the supply of the T-phase current. Thereafter, the repulsive magnetic fields are periodically emitted. As a result, the molten metal inside the annular iron cores 21 to 25 are driven around the central axis CL.

Since the repulsive magnetic fields $H_R$, $H_S$, and $H_T$ emitted by the yokes 31 to 36 of the magnetic field device 2B have substantially the same intensity distribution along the central axis CL direction, the molten metal driving device 1B can generate a uniform stirring force around the central axis CL.

Furthermore, the stirring force of the molten metal can be adjusted by adjusting the magnitude and/or frequency of the AC current output from the AC power supply 7.

Note that the number of iron cores in the magnetic field device 2B is not limited to five, and may be any number. For example, the number of iron cores may be determined based on the length of the molten metal to be stirred (for example, the length of a mold 400 to be described later). Furthermore, the number of yokes is not limited to 6, and may be a multiple of 3, such as 9, 12, or the like. By increasing the number of yokes, the molten metal can be stirred more uniformly.

<Continuous Casting System>

As an application example of the molten metal driving device 1B according to the third embodiment, a continuous casting system 1300 will be described with reference to FIG. 15.

The continuous casting system 1300 is configured to receive the supply of the molten metal M in the liquid phase state of the conductive material and cool the molten metal M to take out a cast product P in the solid phase state.

The continuous casting system 1300 includes the cylindrical mold 400 and the molten metal driving device 1B in which the mold 400 is disposed inside the case 5B. The molten metal driving device 1B is disposed such that the annular iron cores 21 to 25 are coaxial with the mold 400. The mold 400 is provided so as to be inserted into the inner cylindrical portion of the case 5B of the molten metal driving device 1B.

The mold 400 receives supply of the molten metal M in a liquid phase state from the inlet side, and discharges the cast product P in a solid phase state by cooling from the outlet side. The mold 400 of the present embodiment has a cylindrical shape. The cylindrical mold 400 is disposed such that its central axis is coaxial with the central axis CL of the magnetic field device 2B. Note that, when the cast product is a slab, a square cylindrical mold is used.

The mold 400 is made of a refractory material. In the case of being made of graphite, graphite is soft in terms of material, so that a cast product having a smoother surface can be obtained.

The mold 400 has a water jacket (not illustrated) for cooling the molten metal M flowing into the mold 400. The cooling water is circulated in the water jacket, and the outer periphery of the mold 400 is cooled by the cooling water. As a result, the molten metal M is rapidly cooled. Note that, as the water jacket, a water jacket having various known structures can be adopted.

As described above, when the three-phase AC current of the AC power supply 7 is supplied to the magnetic field device 2B, a moving magnetic field is generated in the mold 400. This moving magnetic field generates an eddy current in the unsolidified molten metal, and the molten metal M is stirred around the central axis CL. Then, the stirred molten metal is cooled by the water jacket, whereby a uniform and high-quality cast product P is obtained.

Figure 15:
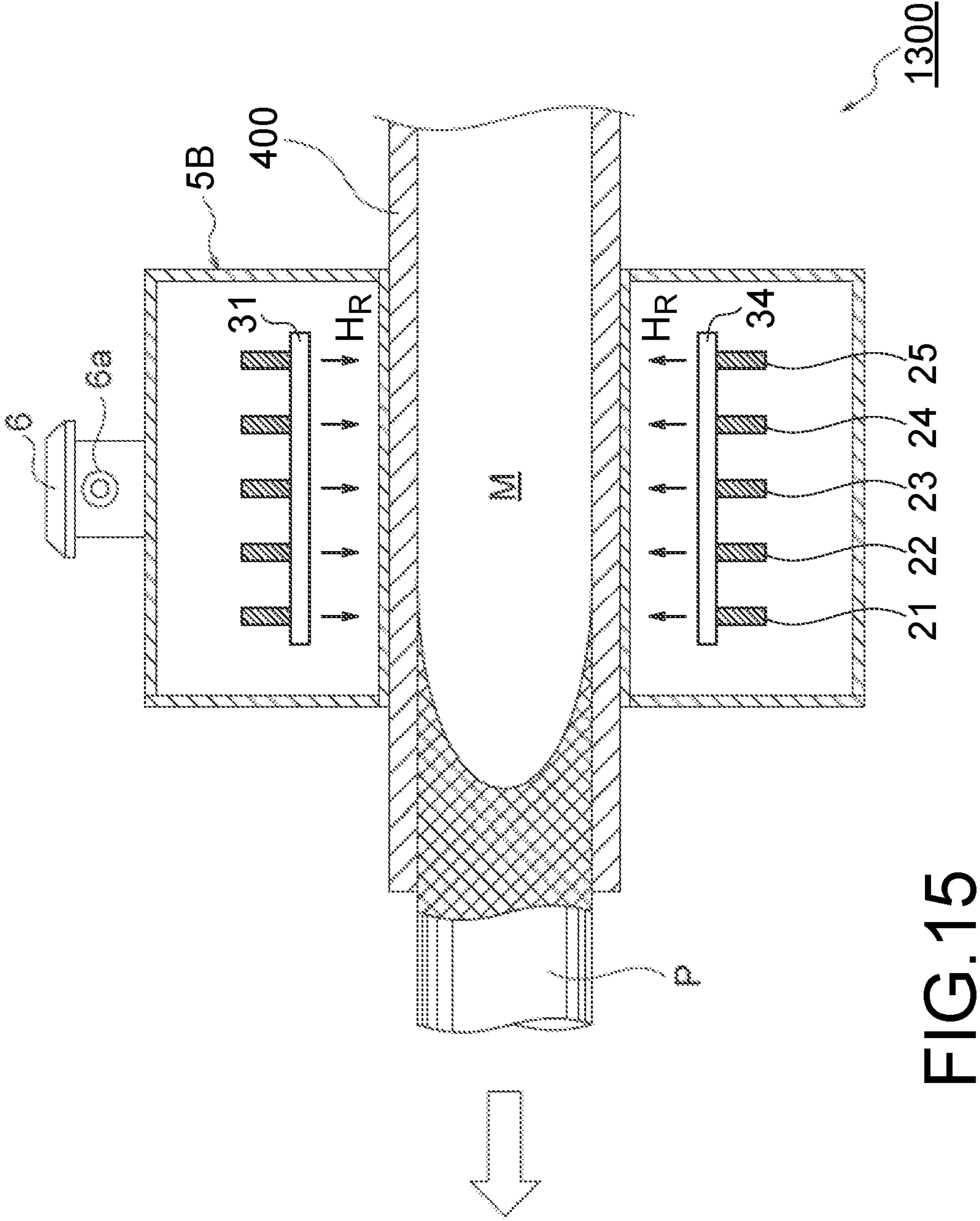
FIG. 15 is a sectional view for explaining generation of magnetic fields by the magnetic field device of the molten metal driving device according to the third embodiment.

As described above, according to the continuous casting system 1300, the molten metal M flows into the inlet side of the mold 400 (the right side in FIG. 15), and the cast product P as a manufactured product is continuously molded from the outlet side (the left side in FIG. 15).

As described above, according to the molten metal driving device 1B, since a uniform stirring force can be generated around the central axis CL, the molten metal M in the mold 400 can be uniformly stirred.

Therefore, according to the continuous casting system 1300 described above, it is possible to obtain a high-quality cast product P having a uniform composition by the moving magnetic field that is strong and uniform around the central axis CL, the moving magnetic field being generated by the magnetic field device 2B of the molten metal driving device 1B.

Based on the above description, a person skilled in the art may conceive additional effects and various modifications of the present invention, but aspects of the present invention are not limited to the individual embodiments described above. Various additions, modifications, and partial deletions can be made without departing from the conceptual idea and spirit of the present invention derived from the contents defined in the claims and equivalents thereof.

For example, the molten metal conveying system may be configured by providing at least one or more molten metal driving devices 1 of the first embodiment on the bottom wall and/or the side walls of the trough 200.

Furthermore, the molten metal stirring system may be configured by housing the furnace 100 in the housing space in the molten metal driving device 1A of the second embodiment.

Furthermore, the molten metal stirring system may be configured by installing the furnace 100 inside the molten metal driving device 1B of the third embodiment.

REFERENCE SIGNS LIST

1 molten metal driving device
2, 2A, 2B magnetic field device
21 to 25 iron core
31 to 36 yoke
41*a*, 41*b*, 44*a*, 44*b* coil
42*a*, 42*b*, 45*a*, 45*b* coil
43*a*, 43*b*, 46*a*, 46*b* coil
41 to 46 series coil
5, 5A, 5B case
5*a* air intake port
5*b* air discharge port
5*s* upper surface
6 terminal box
6*a* wiring introduction port
7 AC power supply
8 mounting base
50 blower
100 furnace
200 trough
210 guide plate
300 container
400 mold
1100, 1100A molten metal stirring system
1200 molten metal conveying system
1300 continuous casting system
CL central axis
D interval (between iron cores)
H1, H2, H3 magnetic field (generated by coil)
$H_R$, $H_S$, $H_T$ repulsive magnetic field
P cast product
T, W thickness (of iron core)

What is claimed is:

1. A molten metal driving device for driving molten metal, the molten metal driving device comprising:
a plurality of iron cores;
a first yoke that couples the plurality of iron cores;
a second yoke that is adjacent to the first yoke and couples the plurality of iron cores;
a third yoke that is adjacent to the second yoke and couples the plurality of iron cores;
a first coil and a second coil wound around at least one of the plurality of iron cores so as to sandwich the first yoke;
a third coil and a fourth coil wound around at least one of the plurality of iron cores so as to sandwich the second yoke; and
a fifth coil and a sixth coil wound around at least one of the plurality of iron cores so as to sandwich the third yoke, wherein
both the first coil and the second coil are wound so as to generate a magnetic field toward the first yoke when a first-phase current flows, both the third coil and the fourth coil are wound so as to generate a magnetic field toward the second yoke when a second-phase current flows, and both the fifth coil and the sixth coil are wound so as to generate a magnetic field toward the third yoke when a third-phase current flows.

2. The molten metal driving device according to claim 1, wherein a plurality of sets of a set of the first yoke, the second yoke, and the third yoke are provided for the plurality of iron cores.

3. The molten metal driving device according to claim 1, wherein the plurality of iron cores have a thickness in a direction in which the first yoke, the second yoke, and the third yoke extend, the thickness being smaller than an interval between the plurality of iron cores.

4. The molten metal driving device according to claim 1, wherein the plurality of iron cores have a thickness in the direction in which the first yoke, the second yoke, and the third yoke extend, the thickness being smaller than a thickness in a direction orthogonal to the direction in which the first yoke, the second yoke, and the third yoke extend.

5. The molten metal driving device according to claim 1, wherein the first coil and the second coil are connected in series to constitute a first series coil, the third coil and the fourth coil are connected in series to constitute a second series coil, the fifth coil and the sixth coil are connected in series to constitute a third series coil, and the first series coil, the second series coil, and the third series coil are star-connected.

6. The molten metal driving device according to claim 5, further comprising an AC power supply that causes an R-phase current to flow through the first series coil, causes an S-phase current to flow through the second series coil, and causes a T-phase current to flow through the third series coil.

7. The molten metal driving device according to claim 1, further comprising
a case that houses the plurality of iron cores, wherein
the case is provided with an air intake port for taking air into the case and an air discharge port for discharging the air in the case to an outside, and
the air intake port and the air discharge port are disposed so as to sandwich the plurality of iron cores.

8. The molten metal driving device according to claim 7, wherein the air intake port is connected with a blower.

9. The molten metal driving device according to claim 1, wherein
the plurality of iron cores extend in parallel to each other, and
the first yoke, the second yoke, and the third yoke are disposed in parallel to each other.

10. A molten metal stirring system comprising:
a furnace that stores molten metal; and
the molten metal driving device according to claim 9, the molten metal driving device being disposed below the furnace.

11. The molten metal driving device according to claim 1, wherein the plurality of iron cores extend in parallel to each other, and the first yoke, the second yoke, and the third yoke are bent along an extending direction of the plurality of iron cores.

12. A molten metal conveying system comprising:

a trough that conveys molten metal; and the molten metal driving device according to claim 11, the molten metal driving device being disposed so as to surround at least a lower side of the trough.

13. The molten metal driving device according to claim 1, wherein the plurality of iron cores are annular iron cores, and are disposed at intervals such that central axes of the iron cores are coaxial, and the first yoke, the second yoke, and the third yoke are disposed inside the annular iron cores.

14. A continuous casting system comprising:

a mold having a cylindrical shape; and the molten metal driving device according to claim 13 in which the mold is disposed inside the annular iron cores.

15. A molten metal driving method for driving molten metal, the molten metal driving method comprising:

disposing a molten metal driving device including a magnetic field device so as to be adjacent to a furnace that stores the molten metal, a trough that conveys the molten metal, or a mold;

the magnetic field device including: a plurality of iron cores; a first yoke that couples the plurality of iron cores; a second yoke that is adjacent to the first yoke and couples the plurality of iron cores; a third yoke that is adjacent to the second yoke and couples the plurality of iron cores; a first coil and a second coil wound around at least one of the plurality of iron cores so as to sandwich the first yoke; a third coil and a fourth coil wound around at least one of the plurality of iron cores so as to sandwich the second yoke; and a fifth coil and a sixth coil wound around at least one of the plurality of iron cores so as to sandwich the third yoke, and causing a first-phase current to flow through the first coil and the second coil to generate a magnetic field toward the first yoke, causing a second-phase current to flow through the third coil and the fourth coil to generate a magnetic field toward the second yoke, and causing a third-phase current to flow through the fifth coil and the sixth coil to generate a magnetic field toward the third yoke.

* * * * *